G. HAYES.
Skylight.
No. 8,675. Reissued April 15, 1879.
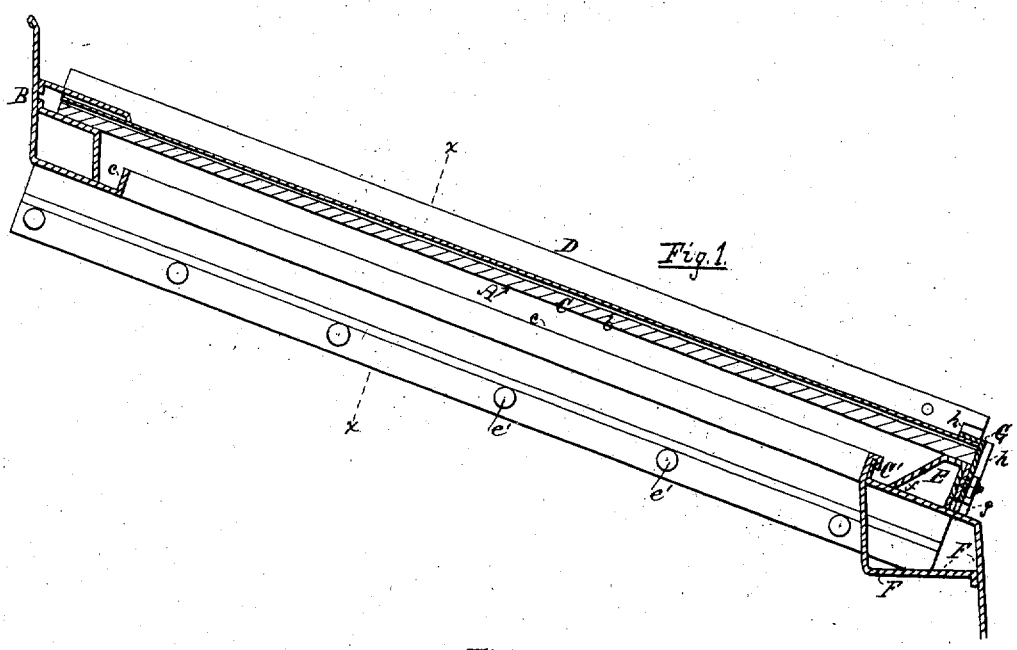
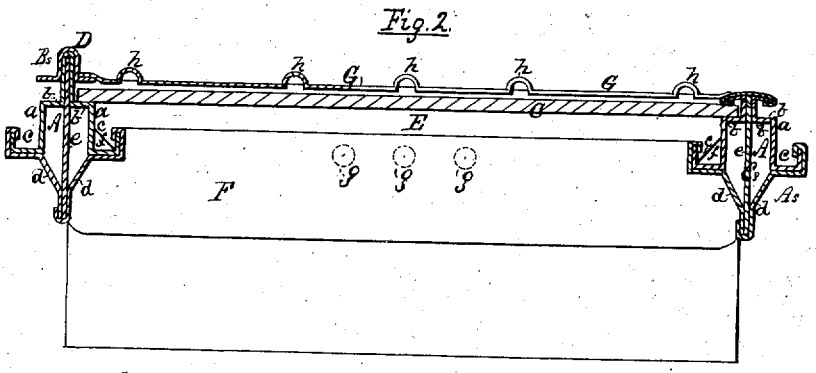
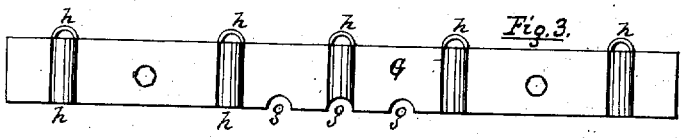
Witnesses.
Samuel M. Hopkins
George A. Hayes.
Inventor.
George Hayes.

UNITED STATES PATENT OFFICE.

GEORGE HAYES, OF NEW YORK, N. Y.

IMPROVEMENT IN SKYLIGHTS.

Specification forming part of Letters Patent No. 106,157, dated August 9, 1870; Reissue No. 8,675, dated April 15, 1879; application filed January 21, 1879.

*To all whom it may concern:*

Be it known that I, GEORGE HAYES, of the city, county, and State of New York, have invented certain new and useful Improvements in Skylights applicable to conservatories and other structures, of which the following is a specification.

My invention has for its object lightness combined with strength, as well as to effectually provide against leakage and the drifting of snow into or beneath the structure.

My invention consists of a combination of a vertical inside plate with the hollow bar or rafter of a metallic skylight or glazed roof. The said plate I designate a "stay-plate," and it serves to give great strength without adding materially to the weight of the rafter. It also serves to facilitate bracing of the gutters of said rafters, and by that means great stiffness is obtained.

It further consists of (in combination with the metallic bars of skylight or glazed roofs) a lower V or other suitably shaped sheet-metal molding, properly secured to the rafter or bar and inside plate, and so connected to the gutters of the rafter as to constitute a brace to prevent their closing together, or a clamp to prevent their spreading, or both, whereby great stiffness is obtained, (in sheet-metal construction,) combined with lightness.

It further consists of the novel construction of a hollow transom, step, or rabbet at the base of skylight, &c., back of the base-gutter, the same having at the bottom end of each of the gutters of the rafters an opening admitting the water from said gutters to the interior thereof, and being provided with openings (one or more) at proper location between said rafters, so as not to be opposite the aforesaid openings from gutters of rafters, and in such manner as will permit the water to escape in an indirect manner from the structure and prevent snow, rain, dust, &c., from beating in.

It further consists of a novel construction of end clip, which is provided with corrugations to constitute gutters, permitting ready escape of water from upper surface of glass plates. This end clip also forms a stop or support for the bottom edges of glass plates, and is provided with openings corresponding with escape-openings of the hereinbefore mentioned transom or rabbet, and is riveted or properly secured thereto.

The indirect arrangement or combination of escape-openings from bar-gutters into interior of transom, thence out, breaking joint to prevent wind beating in, &c., is an important part of my invention.

At the upper part of the skylight, against the ridge connected thereto I have a flange reaching downward and outward at a proper slope to cover upper edge of glass plates, and beneath the same I construct a rabbet with proper slope also, upon which the glass rests. This rabbet, with the aforesaid covering-plate, is situated so that the glass sits between them as in a groove, and is thus arranged perfectly tight and leakage prevented.

In the accompanying drawings, Figure 1 represents a vertical section of the one-half of a conservatory or skylight roof containing my improvements; Fig. 2, a section taken in a crosswise direction to Fig. 1, through the line *x x*. Fig. 3 is a front or side view of an end clip at foot of the roof detached.

Like letters refer to like parts.

A A represent the hollow metallic rafters of the skylight or roof, varying in length, size, and number, according to the area designed to be covered, and serving, in connection with cross-beams or transoms, to form a main frame. These rafters are each composed of a sheet-metal body, *a*, bent to form rabbets *b b*, for support of the panes or sheets of glass C, and gutters *c c*, for the escape of water, should a leakage occur, or from other cause. Inside said bar or rafter I use an internal or stay plate, placed vertically or edgewise, extending upward, entering ridge of rafter, and downward until it reaches a lower V or other suitably shaped molding, *d*, forming a bottom cap or covering and giving a finish to the rafter. This cap or molding *d* extends outward and upward, so that its extreme edges are attached to or connected with outside edges of gutters *c c*. I also attach the said cap *d* to the inside stay-plate, which I have marked *e*, by suitable bolts or rivets *e'*. When thus secured it serves to form a brace to prevent gutters *c c* from bending or being pressed inward, and also a clamp to prevent said gutters *c c* from bending or being pressed outward, serving materially to stiffen the rafter, adding great strength without adding excess of weight, and by increasing the thickness of stay-plate *e* greater strength may be added, if desired, without increasing the shell or body of rafter.

The glass C lies on the rabbets *b b* of rafters, and I protect its edges and cover the joining by sheet-metal caps, which, as shown at D, may be of saddle or inverted-U shape, to better brace or stiffen the upper joint of rafter that it is seated on and suitably secured to.

The cross-beams or transoms E have gutters C′, connecting with gutters *c c* of rafters, to carry off the water formed by condensation or leakage. The said transom is hollow, and provided with openings at *f f*, which are at the bottom end of gutters *c c* of rafters, and through inside face or wall of transom, and in or through its outside wall or face, I provide other openings, as many as desirable, but at a proper location intermediate or more centrally, so as not to be opposite to openings *f f*, about as shown by dotted circles *g g g*, Fig. 2. In this view the spectator is supposed to be looking against the inner face of frame F, which forms the base of the structure; also, base-gutter C′ and a part of transom E being seen, the rafters, glass, &c., being shown in section. At *f f*, same figure, may be seen the outlets by which water escapes from gutters *c c* of rafters, and at *g g g* dotted openings show position of outlets leading from transom E outwardly beyond the structure. The openings *g* would not be visible in this view, as they occur in the outer wall of transom; and this view looks toward its interior or inside wall, in which do occur the apertures *f*, leading from bar-gutters *c c*. The top of transom forms a rabbet or ledge, upon which rests the lower edge of glass plates.

Instead of making the outlets for escaping water in a direct line to or over the frame F, that lies over the usual curbing, which would allow drifting in of snow, &c., I cause the water from bar and base gutters to escape by end outlets, *f f*, under cover of the hollow transom E or rabbet, and finally to pass off by apertures *g*, made intermediately of the latter in the front thereof, and also through or under end clip, G, at the foot of roof, which arrangement effectually provides against the beating in of snow, rain, dust, &c. The outlets *f f* may be covered by strainers, if desired.

The end clip, G, I make of angular form in its transverse section, to cover lower edge of glass, and to overlap the front face of transom E, and I provide corrugations *h h* therein, which not only give strength to the clip, but constitute gutters for water to run off from the glass.

At the upper part of the skylight or roof I show a ridge-plate, B, which may form a wall of ventilator, and to its front I attach a flange to cover upper edge of glass plates, and beneath the same I attach a piece of sheet metal bent to form a rabbet, upon which the glass rests. Between this and aforesaid flange a groove is formed, into which the glass is fitted securely and the joint rendered tight. A gutter at this point may be used, if desired, also.

What I claim as my invention, and desire to secure by Letters Patent of the United States, is—

1. In combination with the rafters or bars of a sheet metal skylight, &c., formed essentially as shown, and having high ridge, a vertical inside plate, *e*, secured therein independently of the cap, substantially as shown and desribed.

2. In combination with a skylight bar or rafter, formed essentially as shown, and having a vertical internal plate, *e*, the lower V-cap or other suitably-shaped sheet-metal molding *d*, secured by rivets, bolts, &c., as shown in Fig. 1, and constituted to form a brace or clamp, whereby the lower portions of bar or gutters *c c* are held firmly, and prevented from either closing or spreading, substantially as specified.

3. The hollow transom, step, or rabbet E, having at the bottom end of each gutter *c c* of the skylight-bars an opening, *f*, through its face, by means of which water passes from gutters *c c* to interior of transom or step, and having at proper locations intermediate—that is to say, more centrally—between the bars or rafters suitable outlets *g*, by means of which said currents of water can pass and escape from the structure in an indirect manner, substantially as shown and specified.

4. The clip G, formed with corrugations or grooves *h*, made to constitute gutters, arranged and applied relatively to the upper surface of the glass, essentially as described.

5. The combination of clip G with transom, step, or rabbet E, connected by bolts or rivets, &c., essentially as shown, whereby a support and stop for the bottom edges of the glass plates is obtained, the clip G having gains, nicks, or cuts *g*, corresponding and combining with apertures *g* of the transom or step E, substantially as shown and described.

6. In the base or base-frame of a metallic skylight, the combination of outlet-apertures *f* and *g*, arranged to break joint, as it were, or form an indirect escape for the water accumulating in the bar-gutters *c c* and base-gutter C′, without permitting the passage inward of wind, dust, rain, snow, &c., substantially as described and set forth.

7. In combination with the plate B, forming the wall of the ventilator or ridge, a flange and a rabbet or ledge formed thereon, and together arranged to form a groove, substantially as shown and described.

GEORGE HAYES.

In presence of—
GEORGE A. HAYES,
ELIZABETH HOPKINS.